(12) United States Patent
Zhang (10) Patent No.: US 8,738,448 B2
(45) Date of Patent: May 27, 2014

(54) WEB PAGE AD SLOT IDENTIFICATION

(75) Inventor: Peng Zhang, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 25 days.

(21) Appl. No.: 13/369,281

(22) Filed: Feb. 8, 2012

(65) Prior Publication Data

US 2013/0204715 A1 Aug. 8, 2013

(51) Int. Cl.
*G06Q 30/00* (2012.01)
(52) U.S. Cl.
USPC ........................................... 705/14.73
(58) Field of Classification Search
USPC ......................................... 705/14.73
See application file for complete search history.

(56) References Cited

U.S. PATENT DOCUMENTS

| | | | |
|---|---|---|---|
| 7,356,547 B2 | 4/2008 | Ozer et al. | |
| 7,870,133 B2 | 1/2011 | Krishnamoorthy et al. | |
| 7,895,077 B2 * | 2/2011 | Anand et al. | 705/14.42 |
| 8,001,105 B2 | 8/2011 | Bolivar et al. | |
| 8,082,174 B1 * | 12/2011 | Kamangar et al. | 705/14.1 |
| 8,234,265 B1 * | 7/2012 | Yagnik | 707/708 |
| 8,335,716 B2 * | 12/2012 | Pradeep et al. | 705/14.41 |
| 8,335,718 B2 * | 12/2012 | Feldman et al. | 705/14.48 |
| 2002/0184093 A1 | 12/2002 | Cherry et al. | |
| 2004/0260767 A1 | 12/2004 | Kedem et al. | |
| 2008/0104194 A1 | 5/2008 | Tsun et al. | |
| 2008/0183573 A1 | 7/2008 | Muschetto | |
| 2009/0182643 A1 * | 7/2009 | Holstein et al. | 705/26 |
| 2010/0185513 A1 | 7/2010 | Anderson et al. | |
| 2010/0287580 A1 | 11/2010 | Harding et al. | |
| 2011/0035437 A1 * | 2/2011 | Toumura | 709/203 |

FOREIGN PATENT DOCUMENTS

WO WO 2011/094734 A2 8/2011

OTHER PUBLICATIONS

Adfonic Publisher API/Ad Server API, http://developer.adfonic.com/index.php/Publisher_API & http://developer.adfonic.com/idex.php/Ad_Server_API#Identifying_and customizing_the_ad_slot, 16 pgs.*
Adfonic Publisher APUAd Server API, Nov. 29, 2011, http://developer.adfonic.comlindex.php/Publisher_API & httU:/IdcveloQer.adtonic.com/idex.Qlm!Ad SenTer API#Idcl1tifying and customizing the ad slot, 16 pgs.*

(Continued)

*Primary Examiner* — John G Weiss
*Assistant Examiner* — Dipen Patel
(74) *Attorney, Agent, or Firm* — Foley and Lardner LLP; John D. Lanza (57) ABSTRACT

Systems and methods of identifying ad elements of web pages via a computer network are provided. A script configured to identify an ad slot on a web page can be obtained by at least one data processing system having an ad slot evaluation module. The script can be executed to obtain advertisement parameters of the ad slot and web page parameters of the ad slot and generate a unique identifier of the ad slot. The generated unique identifier is associated with a URL identifier of the web page. The data processing system evaluates at least one database to determine one of a presence and an absence of the historical ad slot data. The data processing system provides content for display in the ad slot of the web page based at least in part on a result of the evaluation of the database.

20 Claims, 4 Drawing Sheets

(56) References Cited

OTHER PUBLICATIONS

Ramakrishna, M.V., et al., "Performance in Practice of String Hashing Functions", Proceedings of the Fifth International Conference on Database Systems for Advanced Applications, Melbourne, Australia, Apr. 1-4, 1997, 9 pgs.*

International Search Report and Written Opinion on PCT/US2013/020630 dated May 30, 2013.*

Adfonic Publisher API/Ad Server API, http://developer.adfonic.com/index.php/Publisher_API & http://developer.adfonic.com/idex.php/Ad_Server_API#Identifying_and_customizing_the_ad_slot, 16 pgs.

Ramakrisiina, M.V., et al., "Performance in Practice of String Hashing Functions", Proceedings of the Fifth International Conference on Database Systems for Advanced Applications, Melbourne, Australia, Apr. 1-4, 1997, 9 pgs.

* cited by examiner

```
<div id = 'id1' ...>
  ....
  <div ...> // no id here
    .....
    <div id= 'id3'...>
      ....
      <script type = "text/javascript">
        ....
        slotname = 'leader board';
        ad_width = '720';
        ad_height = '16';
        ad_format = '720x16_as';
        ad_type = 'text'.
        ....
      </script>
      <script type = "text/javascript"
          src = "http://pagead2.example.com/pagead/show_ads.js">
      </script>
    </div>
  </div>
</div>
```

```
<script>
  var scripts = document.getElementsByTagName('script')
  var lastScript = scripts[scripts.length - 1];
  var enclosingNode = lastScript.parentNode;
  var id = enclosingNode.id;
</script>
```

WEB PAGE AD SLOT IDENTIFICATION

BACKGROUND

Advertisements (or ads) can be placed at various locations on a web page. Advertisements can also be of different size or shape, or have different content requirements. An advertisement suitable for placement at one location of a web page may not be suitable at another location. In addition, advertisements placed at different locations of the web page perform differently. Furthermore, web page content and layout can be changed, for example by web page publishers, from time to time. Such changes can alter the location of advertisements on the web page.

SUMMARY

At least one aspect is directed to a computer implemented method of identifying ad elements of web pages via a computer network. The method obtains, by at least one data processing system having an ad slot evaluation module, a script configured to identify an ad slot on a web page. The method executes the script to obtain advertisement parameters of the ad slot and web page parameters of the ad slot. Based on the advertisement parameters and the web page parameters, the method generates a unique identifier of the ad slot. The generated unique identifier is associated with a URL identifier of the web page. The method evaluates at least one database to determine one of a presence of historical ad slot data and an absence of the historical ad slot data by searching for a historical unique identifier that matches the unique identifier. The historical unique identifier is associated with the URL identifier of the web page. The method provides content for display in the ad slot of the web page based at least in part on a result of the evaluation of the database.

At least one aspect is directed to a system of identifying ad elements of web pages via a computer network. The system includes at least one data processing system having an ad slot evaluation module. The at least one data processing system can obtain a script configured to identify an ad slot on a web page. The data processing system can execute the script to obtain advertisement parameters of the ad slot and web page parameters of the ad slot. Based on the advertisement parameters and the web page parameters, the data processing system can generate a unique identifier of the ad slot. The generated unique identifier is associated with a URL identifier of the web page. The data processing system can evaluate at least one database to determine one of a presence of historical ad slot data and an absence of the historical ad slot data by searching for a historical unique identifier that matches the unique identifier. The historical unique identifier is associated with the URL identifier of the web page. The data processing system can provide content for display in the ad slot of the web page based at least in part on a result of the evaluation of the database.

At least one aspect is directed to a non-transitory computer-readable medium having machine instructions stored therein. The instructions are executable by one or more processors to cause the one or more processors to perform operations comprising instructions to obtain a script configured to identify an ad slot on a web page. The instructions execute the script to obtain advertisement parameters of the ad slot and web page parameters of the ad slot. Based on the advertisement parameters and the web page parameters, the instructions generate a unique identifier of the ad slot. The generated unique identifier is associated with a URL identifier of the web page. The instructions evaluate at least one database to determine one of a presence of historical ad slot data and an absence of the historical ad slot data by searching for a historical unique identifier that matches the unique identifier. The historical unique identifier is associated with the URL identifier of the web page. The instructions provide content for display in the ad slot of the web page based at least in part on a result of the evaluation of the database.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

Like reference numbers and designations in the various drawings indicate like elements.

DETAILED DESCRIPTION

Following below are more detailed descriptions of various concepts related to, and embodiments of, methods, apparatuses, and systems for identifying ad elements of web pages in order to provide content to web pages, such as advertisements, via a computer network. The various concepts introduced above and discussed in greater detail below may be implemented in any of numerous ways, as the described concepts are not limited to any particular manner of implementation. Examples of specific implementations and applications are provided primarily for illustrative purposes.

When a user device accesses a web page, a web page server of the web page can provide webpage data to the user device. The web page data may cause the user device to retrieve an advertisement from an advertisement server (or other advertisement providers) via a computer network. The advertisements may be placed at various locations on the web page. For example, advertisements may be placed on top of the web page, in a banner, on a side of the webpage, or above the fold of the web page. In the context of online advertisement, above the fold may refer to the part of a web page that is first visible upon rendering of a web page without scrolling. The ad slots at these different locations of the web page can have different size, shape, or content requirements. As a result, an ad suitable for placement at one location may not be suitable at another location. In some cases, a content provider such as an advertiser may only want to place its ads on some locations and may be willing to pay more for those locations. For example, an advertiser may only want its ads to be placed above the fold.

Web page layouts can change with time, and the parameters and locations associated with the ad slots may also change when web page publishers change the web page layout. It can be beneficial for an advertisement server to determine when parameters and locations associated with the ad slots change in order to provide suitable ads based on any changed parameters and locations. The systems and methods described herein generate unique identifiers for ad slots. From the unique identifiers, the systems and methods identify changes (or the lack thereof) to web page layouts and can use this information to identify content suitable for the ad slots and/or to more accurately track advertisement performance and effectiveness as the web page evolves and changes with time.

Figure 1:
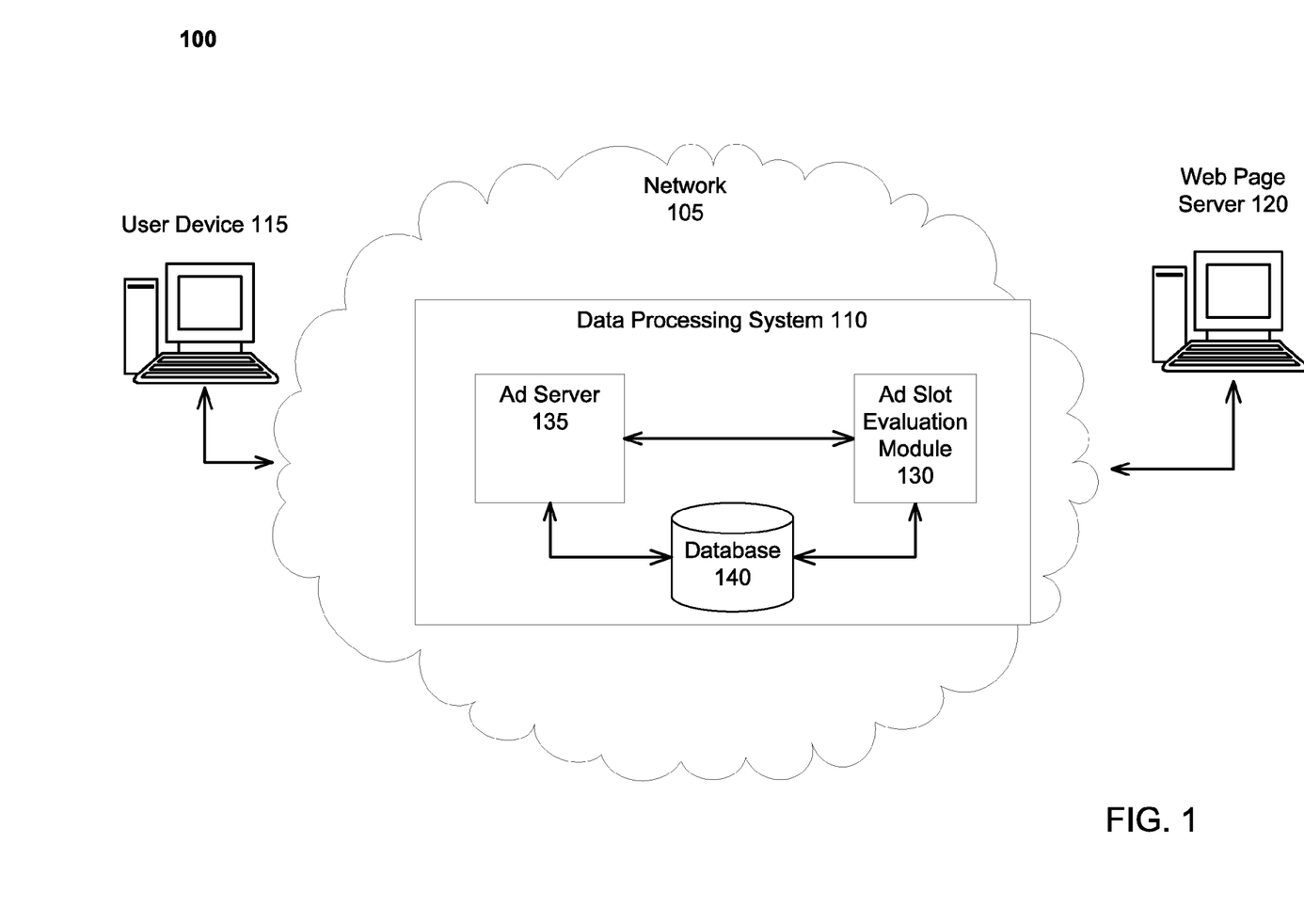
FIG. 1 illustrates an example system of identifying ad elements of web pages via a computer network.

FIG. 1 illustrates an example system 100 of identifying ad elements of web pages via a computer network, such as network 105. The network 105 can include computer networks such as the Internet, local, wide, or metro or other area networks, intranets, or other computer networks such as data or voice mobile telephone communication networks. Network 105 can also include any number of computing devices (e.g., computer, servers, routers, network switches, etc.) that are configured to receive and/or transmit data within network 105. Network 105 can further include any number of hardwired and/or wireless connections. For example, user device 120 may communicate wirelessly (e.g., via WiFi, cellular, radio, etc.) with a transceiver that is hardwired (e.g., via a fiber optic cable, a CATS cable, etc.) to other computing devices in network 105.

The system 100 can include at least one data processing system 110. The data processing system 110 includes at least one processor or other logic device to communicate with at least one user device 115 and/or at least one web page server 120 via the network 105. In some implementations, the data processing system 110 includes at least one ad slot evaluation module 130, at least one ad server 135, and at least one database 140.

The user device 115 can include computing devices such as a computer, laptop, desktop, smart phone, tablet, personal digital assistant, or server device configured to communicate with other devices via the network 105. The user device 115 can execute a software application (e.g., a web browser or other application) to retrieve content from other devices over network 105.

The web page server 120 can include a computer having a server configured to host at least one web page. For example, the web page server 120 may be a computer server (e.g., an FTP server, file sharing server, web server, etc.) or a combination of servers (e.g., a data center, a cloud computing platform, etc.). The web page server 120 can provide webpage data and/or other content (e.g., text documents, PDF files, and other forms of electronic documents) to user device 115. In one implementation, the user device 115 can access the web page server 120 via the network 105 to request access to a web page of the web page server 120. Portions of the web page can be dedicated for content such as advertisements. For example, the web page can include ad slots configured to receive third party content such as advertisements provided by, for instance, an advertiser.

Responsive to a request for access to a web page (e.g., by the user device 115), the web page server 120 can provide webpage data to user device 115 that causes user device 115 to communicate with the data processing system 110 and request content for display in an ad slot of the web page (e.g., the webpage data may include an advertisement tag). The data processing system 110 can identify this content and provide the content from the database 140 (or instruct a content provider, for example an advertiser, to provide the content) for display with the web page.

According to various implementations, web page server 120 may provide webpage data to user device 115 that includes one or more advertisement tags. In general, an advertisement tag may be any piece of webpage code associated with placing an advertisement into an ad slot of a webpage. In some implementations, an advertisement tag may define an ad slot on a webpage for an advertisement, or an ad slot for an out of page advertisement (e.g., an interstitial advertisement slot). In one implementation, web page server 120 may provide webpage data that causes user device 115 to retrieve an advertisement from ad server 135. In another implementation, the advertisement may be provided by ad server 135 to web page server 120 and provided as part of the webpage data sent to user device 115.

In some implementations, the data processing system 110 obtains a script. The script (e.g., JavaScript) can be executed to obtain advertisement parameters of the ad slot and the web page parameters of the ad slot. For example, the script can include a segment of computer implemented code created by a programmer and provided to the data processing system 110. In one implementation, the script can be retrieved from the database 140 and provided from the data processing system 110 to the user device 115 for execution at the user device 115. The script, when executed, can read the advertisement parameters and the web page parameters from the web page. In another implementation, the data processing system 110 can provide the script from the database 140 to the web page server 120. In this implementation, the script can execute at the web page server 120 to obtain the advertisement parameters and the web page parameters.

In one implementation, the ad server 135 can provide the script to another data processing system component (e.g., the ad slot evaluation module 130) for execution. In another implementation, the ad server 135 can be a separate component from the data processing system 110. For example, the data processing system 110 can be part of the user device 115 or web page server 120. In this example, the data processing system 110 can be configured to communicate with the ad server 135 via the network 105 and the script, which is provided by the ad server 135, can execute at the data processing system 110. In another example, the ad slot evaluation module 130 is included in the ad server 135.

The advertisement parameters can include parameters, for example, that indicate characteristics of the advertisement such as an ad width, an ad height, an ad type (e.g., image, text, audio, video), an ad format (e.g., '728×90_pas_abgc'), and an ad slot name (e.g., 'leader board'). The web page parameters can include, for example, identifiers of parent nodes of the ad slot in a hierarchical structure of the web page.

Figure 2A:
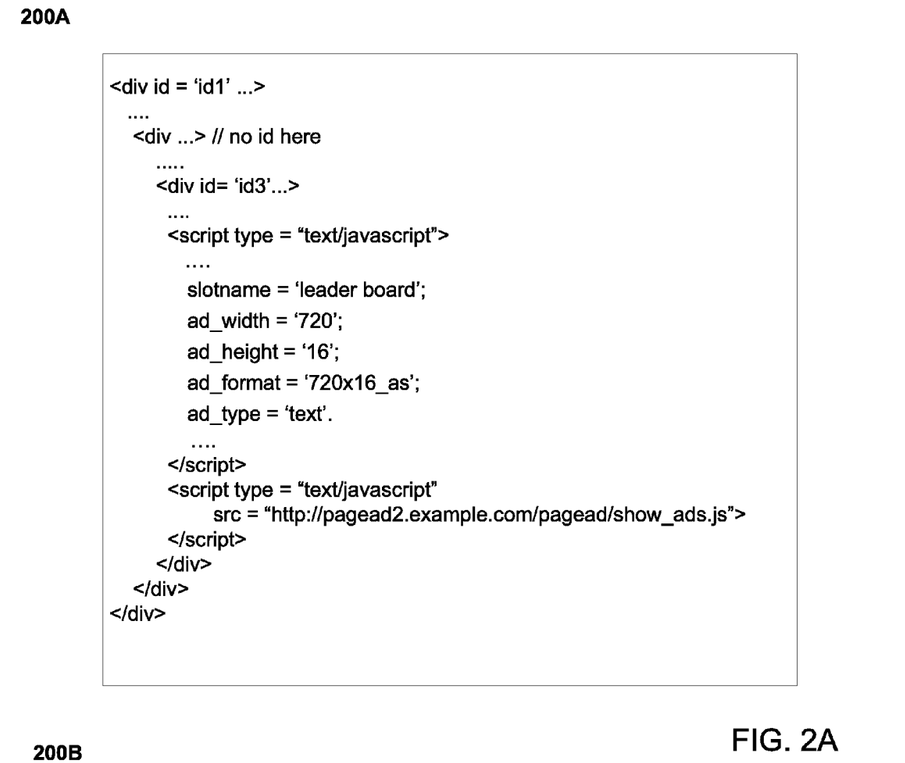
FIG. 2A illustrates an example of HTML code for a web page that indicates advertisement parameters and the web page layout that can be used to identify web page parameters.

FIG. 2A illustrates an example of HTML code for a web page that indicates advertisement parameters and the web page layout that can be used to identify web page parameters. In this example, the advertisement parameters (such as slotname='leader board'; ad_width='720'; ad height='16'; ad_format='720×16_as'; and ad_type='text') are enclosed between the first set of <script type="text/javascript"> and </script> tags. The advertisement parameters generally indicate characteristics of an advertisement, such as ad dimensions or they type of ad, such as video or text. In other implementations, advertisement parameters may include fewer, additional, or any other different parameters.

Further, in the example in FIG. 2A, the document (or web page) is divided into three sections or elements by the <div> tags. Usually, a <div> tag can allow HTML and XML documents to be divided into sections or elements. A <div> may support various attributes, such as class (e.g., specifies a classname for an element), dir (e.g., specifies the text direction for the content in an element), id (e.g., specifies an id for an element), lang (specifies a language code for the content in an element), style (specifies an inline style for an element), etc. In the above example, the first <div> tag has an id of 'id1', the second <div> tag has no id, while the third <div> has an id of 'id3'.

Continuing with the example in FIG. 2A, the JavaScript application programming interface (API) call (e.g., <script type="text/javascript" src="http://pagead2.example.com/pagead/show_ads.js">) may be invoked, for example in one implementation, when user device 115 requests an advertisement from ad server 135. In one implementation, when the API is called, script code may be executed to obtain advertisement parameters and web page parameters.

Figure 2B:
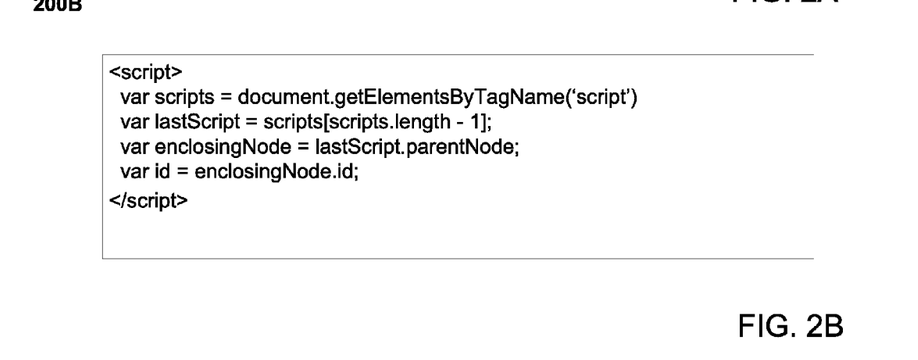
FIG. 2B illustrates an example script code that can be executed to determine the web page parameters from the web page layout.

In one implementation, the web page parameters may include several identifiers of DOM elements (e.g., identifiers of parent nodes of the ad slot in a hierarchical structure of the web page). The web page parameters can represent characteristics or attributes (e.g., layout, location, etc.) of the ad slots of the web page. This information can be used by the data processing system 110 to identify ad slot characteristics such as the location of an ad slot on a web page. When the location of an ad slot changes, the identifiers of parent nodes of the ad slot may also change. FIG. 2B illustrates an example script code that can be executed to determine the web page parameters from the web page layout. The web page parameters can be used to determine the unique identifier of the ad slot. For example, with reference to FIGS. 2A and 2B, the script may be executed to determine the web page parameter (represented by the identifier id3 in FIG. 2A). In this example, the DOM element 'id3' is a web page parameter that identifies a DOM element associated with the ad slot. In one implementation, once the closest (or innermost) element id is obtained, the script may retrieve other the ids of the parent nodes of the ad slot. The web page parameters can be represented by the ids of the parent nodes of the ad slots (as illustrated in FIG. 2A). In other implementations, the web page parameters may be represented by other attributes of the parent nodes of the ad slots (e.g., class, lang, style, etc.).

The system 100 can also generate a unique identifier of the ad slot based on the advertisement parameters and the web page parameters. In some implementations, the unique identifier can be generated at the user device 115 or web page server 120. For example, the unique identifier can be generated when the JavaScript API call is invoked as illustrated in FIG. 2A. In other implementations, the unique identifier can be generated at the data processing system 110 which, in one implementation, includes the ad slot evaluation module 130 and the ad server 135. For example, the unique identifier can be generated after the data processing system 110 receives the advertisement parameters and the web page parameters.

In one implementation, the data processing system 110 can generate a unique identifier for the ad slot using a map routine (e.g., a hash function). For example, the advertisement parameters and the web page parameters can be input into a hash function to generate a unique identifier. In one implementation, the advertisement parameters may be concatenated into a string. For example, a string of 'leader board 720 16 300×250 as text' may be produced by concatenating the advertisement parameters in the example in FIG. 2A. In another example, a string of 'id3, id1' may be produced for the DOM elements (web page parameters) in FIG. 2A. In one implementation, the two strings of advertisement parameters and web page parameters may be combined with ':' and input into a hash function to generate a unique identifier. In one implementation, a 32-bit integer may be generated as the unique identifier by the hash function. For example, a unique identifier with the value of 2249068286 may be generated. In other implementations, the unique identifier may be generated in other forms or types.

In some implementations, the data processing system 110 determines whether or not the database 140 includes information about the ad slot that is part of the web page requesting content. For example, the data processing system 110 can determine whether or not information about this ad slot already exists. The ad slot evaluation module 130 (or other data processing system component) can search the database 140 for existing historical ad slot information by matching the unique identifier with historical data about that ad slot. Continuing with this example, the data processing system 110 may have already provided content for a previous rendering of the same ad slot in a web page, and a historical unique identifier may have been generated at that time, and stored in the database. In one implementation, the same ad slot will generate the same identifier when the advertisement parameters and web page parameters remain constant. For example, the same ad slot will generate the same unique identifier each time that the data processing system 110 receives a request to provide content for that ad slot. The ad server 135 can provide content for display, and store in the database 140 information about the content that was provided. The information can indicate the type of ad slot (e.g., expanding, banner, above the fold), the location of the ad slot (e.g., X and Y coordinates on the web page), whether or not the content was clicked on or converted when it was displayed, and what content was previously provided for display in the ad slot.

Information about this previous rendering can be considered by data processing system components (e.g., the ad server 135 or the ad slot evaluation module 130) to identify suitable content to provide to the ad slot responsive to a present request for content. For example, if an ad displayed in that ad slot in the past were successful, the ad server 135 can provide the same or similar content in response to a present request. Various metrics can be used to determine the success of content displayed in ad slots, such as click through or conversion rate of the content, for example.

In one implementation, the data processing system 110 evaluates the database 140 to determine that historical ad slot data is present. For example, the data processing system 110 can compare the unique identifier generated in response to a present request for content with a historical unique identifier generated in response to a previous request for content. Ad slots of different web pages can generate the same unique identifier when, for example, they have the same advertisement parameters and web page parameters. Thus, in one implementation, the data processing system 110 searches for a match between the unique identifier and a historical unique identifier. In this example, identifying the presence of historical data in the database is determined when the unique identifier and historical unique identifier correspond to the same web page (e.g., same uniform resource locator (URL) identifier of the web page). In another example, the search for a match is based on the domain name instead of the URL identifier. For example, ad slots with the same unique identifier may appear on two different web pages (having different URL identifiers) of the same web site domain name. In this example, the two different URL identifiers share a common domain name and the data processing system can determine from this information and a unique identifier match that historical ad slot data exists in the database 140.

In some implementations, the data processing system 110 identifies the absence of a match (e.g., determines that there is no historical ad slot data in the database 140 that corresponds to an ad slot of a web page requesting content). In this example, the ad server 135 may provide content based at least in part on the advertisement parameters obtained during execution of the script, without considering historical information.

In one implementation, the data processing system 110 provides content for display in the ad slot. For example, the ad server 135 can identify content (e.g., an advertisement) based on the advertisement parameters and historical ad slot data (when identified by the data processing system 110 as being present). The ad server 135 may also consider additional information such as Internet activity of a user of the user device 115 requesting access to the web page, or information about the content of the web page (e.g., the subject matter of the web page).

For example, in one implementation, after a match is found between the unique identifier and the historical unique identifier, the location of an ad slot in the historical ad slot data may be used to identify whether the ad slot is above the fold, below the fold, in the middle, etc. For instance, when the ad slot is identified as an above the fold ad slot, advertisements that are specifically requested to be placed above the fold may be retrieved. In another example, when the ad slot is identified as a below the fold ad slot, advertisements that are specifically requested to be placed above the fold may not be retrieved. In some implementations, when the unique identifier does not match any historical unique identifiers for the web page, advertisements that have no specific requirements regarding where to be placed can be used. For example, if an advertisement is configured for placement at a location above the fold of a web page, the above the fold advertisement may not, in this example, be placed in this ad slot because the location of this ad slot on the web page (e.g., above or below the fold) may be unknown.

In some implementations, the unique identifier can be used to identify the same template within the same domain so that different web pages of the same template can be clustered together. For example, if within the same domain, the ad slots on two different web pages have the same unique identifier, it may be determined that the two web pages use the same template. Thus, only one template (rather than two web pages) may be required to be stored into the database, and thus more database resources can be saved. In one implementation, the unique identifier can be used for targeting or analysis. For example, the unique identifier can be used to help accurately track the click through rate of an ad slot. For example, when an ad slot location is changed, the unique identifier is changed, and thus the evaluation or calculation of the click through rate of the ad slot should be reset or restarted.

Figure 3:
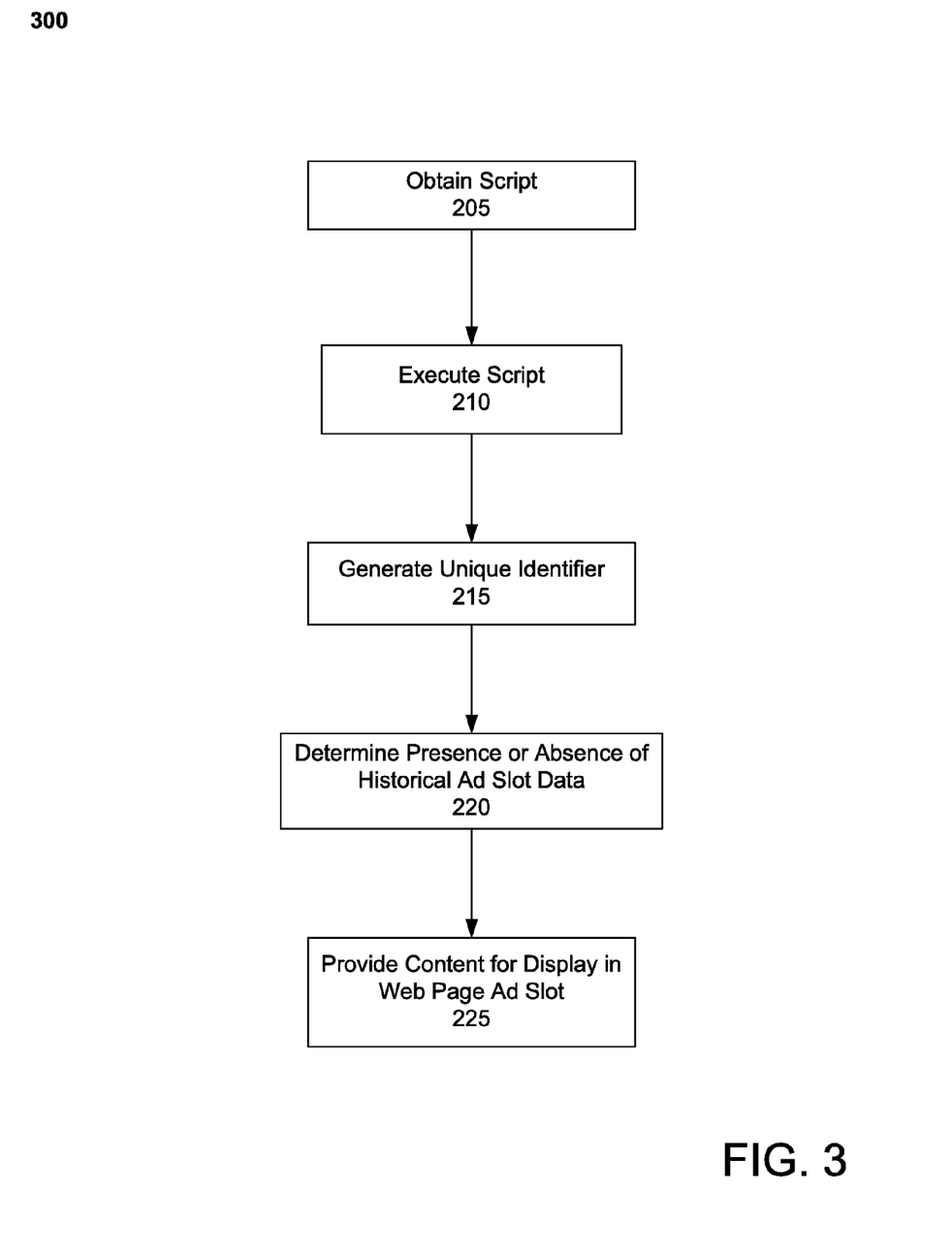
FIG. 3 illustrates a flow diagram depicting a method of identifying ad elements of web pages via a computer network.

FIG. 3 illustrates a flow diagram depicting a method 300 of identifying ad elements of web pages via a computer network. The method 300 can obtain a script configured to identify an ad slot on a web page (BLOCK 205). For example, a data processing system having an ad slot evaluation module can obtain a script which is configured to identify an ad slot on a web page. In some implementations, the script may be provided by an ad server to a user device or a web page server after the ad server received a request for subject matter or content (e.g., an advertisement) to display in the ad slot of the web page.

The method 300 can execute the script to obtain advertisement parameters of the ad slot and web page parameters of the ad slot (BLOCK 210). In some implementations, the script is configured to execute at the user device (e.g., in a web browser) to obtain the advertisement parameters and the web page parameters. In other implementations, the script is configured to execute at the web page server to obtain the advertisement parameters and the web page parameters. In one implementation, the advertisement parameters can include, for example, at least one of an ad width, an ad height, an ad type, an ad format, and an ad slot name. The web page parameters can include, for example, identifiers of parent nodes of the ad slot in a hierarchical structure of the web page.

The method 300 can generate a unique identifier based on the advertisement parameters and the web page parameters (BLOCK 215). The generated unique identifier can be associated with a URL identifier of the web page. In some implementations, the unique identifier can be generated at the user device or the web page server when the script is executed. In these implementations, the unique identifier may then be received by the ad server for further processing. In other implementations, the unique identifier can be generated at the ad server after the ad server receives the advertisement parameters and the web page parameters. In one implementation, the unique identifier may be generated by using a hash function. For example, in one implementation, the unique identifier may be generated by concatenating the advertisement parameters into a first string and concatenating the web page parameters into a second string, combining the first string and the second string into a combined string, and inputting the combined string into the hash function.

The method 300 can determine the presence or absence of historical ad slot data (BLOCK 220). For example, the data processing system (e.g., an ad slot evaluation module) can evaluate at least one database for the existence of historical ad slot data by searching for a match between the unique identifier and a historical unique identifier. The historical unique identifier can be associated with the URL identifier of the web page. In one example, a match between the unique identifier and the historical unique identifier can be identified.

In a second example, no match (i.e., the absence of a match) can be identified between the unique identifier and the historical unique identifier. Continuing with this example, the data processing system may then identify a domain name of the web page associated with the URL identifier of the web page. The data processing system may further associate the unique identifier with the domain name and associate the historical unique identifier with the domain name. In this example, the data processing system may detect a match between the unique identifier and the historical unique identifier. In a third example, no match may be identified between the unique identifier and the historical unique identifier when they both are associated with the domain name. In the above examples, when a match is identified between the unique identifier and the historical unique identifier, it may indicate that historical ad slot data is present or available for the ad slot; when no match is identified, it may indicate that historical ad slot data is not present or available for the ad slot.

The method 300 can provide content or subject matter (e.g., an advertisement) for display in the web page ad slot based at least in part on the result of the evaluation of the database (BLOCK 225). In some implementations, when a match is identified between the unique identifier and the historical unique identifier, the data processing system may select content (e.g., an advertisement) based at least in part on the historical ad slot data. For example, the historical ad slot data may include the historical unique identifier, the URL identifier of the web page, the location of an ad slot on the web page, and an indication of ad slot activity including at least one of a click through rate, a conversion rate, a click through volume, a conversion volume, a type of advertisement, etc. In one implementation, in addition to the historical ad slot data, the content may also be selected based on, for example, advertisement parameters. In other implementations, when no match is identified between the unique identifier and the historical unique identifier, the data processing system may select content based at least in part on advertisement parameters, without considering historical information. The content (e.g., an advertisement) selected may then be provided for display in the ad slot of the web page.

Figure 4:
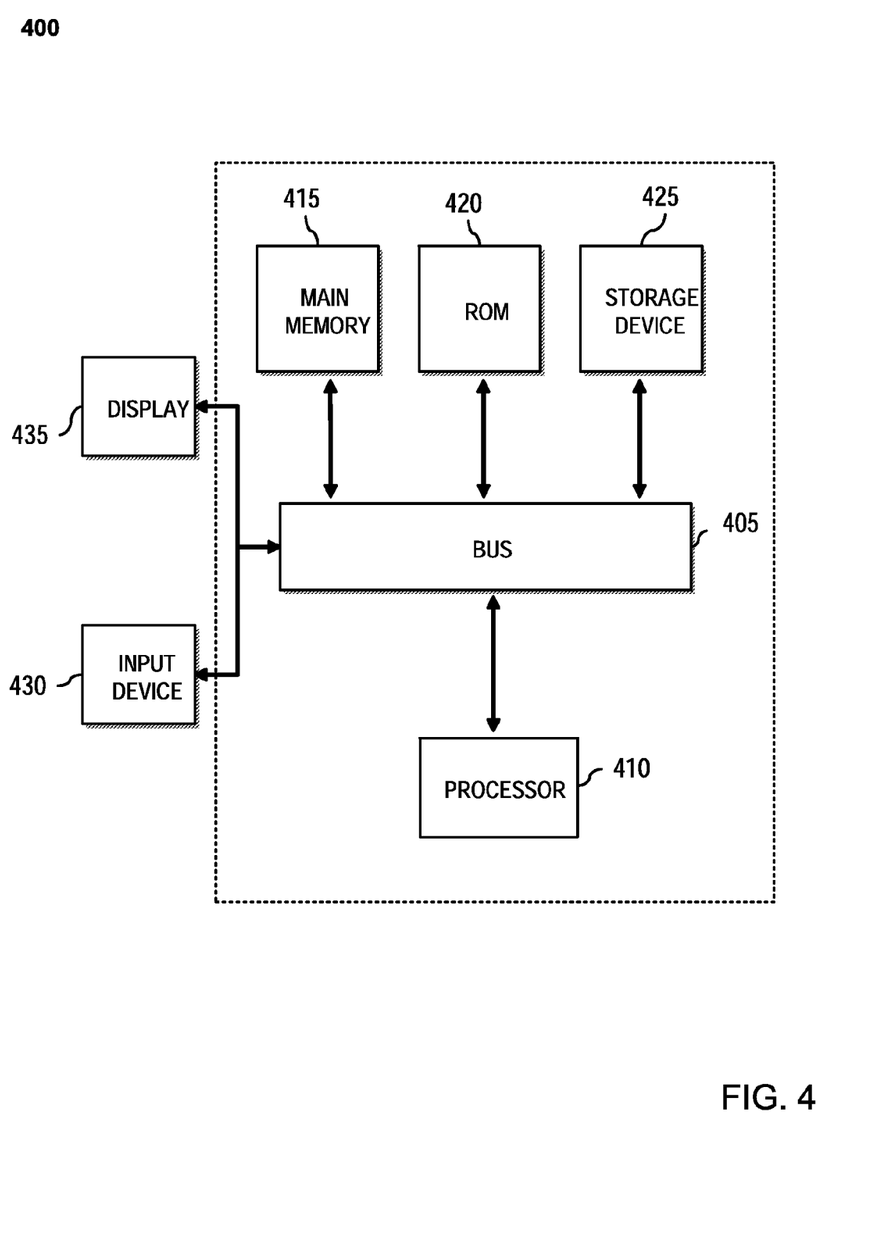
FIG. 4 is a block diagram of a computer system in accordance with an illustrative implementation.

FIG. 4 is a block diagram of a computer system in accordance with an illustrative implementation. The computer system or computing device 400 can be used to implement any of the computer systems discussed herein (including the system 100 and its components such as the ad slot evaluation module 130) in accordance with some embodiments. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The processors 410 can be included in the data processing system 110 or the other components of the system 100. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 410 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus" or "data processing system" or "computing device" or "processing circuit" encompass all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special-purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

Any references to embodiments or elements or acts of the systems and methods herein referred to in the singular may also embrace embodiments including several of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the embodiment may be included in at least one implementation or embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of identifying ad elements of web pages via a computer network, comprising:
 obtaining, by one or more processors of at least one data processing system, a script configured to identify an ad slot on a web page;
 executing the script to obtain advertisement parameters of the ad slot and to obtain web page parameters of the ad slot;
 generating, by at least one of the one or more processors, based on the advertisement parameters and the web page parameters, a unique identifier of the ad slot, wherein the unique identifier of the ad slot is associated with a URL identifier of the web page;

evaluating at least one database to determine one of a presence of historical ad slot data and an absence of the historical ad slot data by searching for a historical unique ad slot identifier that matches the unique identifier of the ad slot, wherein the historical unique ad slot identifier is associated with the URL identifier of the web page;

determining, by at least one of the one or more processors, an absence of a match between the unique identifier of the ad slot associated with the URL identifier of the web page and the historical unique ad slot identifier associated with the URL identifier of the web page;

identifying, responsive to the absence of the match, a domain name of the web page associated with the URL identifier of the web page;

associating the unique identifier of the ad slot with the domain name;

associating the historical unique ad slot identifier with the domain name;

detecting a match between the unique identifier of the ad slot associated with the domain name and the historical unique ad slot identifier associated with the domain name;

selecting content based at least in part on the historical ad slot data;

providing, via the computer network, the content for display in the ad slot of the web page.

2. The method of claim 1, wherein the at least one data processing system includes an ad server, further comprising:
receiving, by the ad server from a user device, a request for subject matter to display in the ad slot of the web page;
providing the script from the ad server to the user device, wherein the script is configured to execute at the user device to obtain the advertisement parameters of the ad slot and the web page parameters of the ad slot, and to generate the unique identifier of the ad slot based on the advertisement parameters and the web page parameters;
receiving, by the ad server, the unique identifier of the ad slot;
identifying the match between the unique identifier of the ad slot and the historical unique ad slot identifier; and
selecting the content based on the historical ad slot data.

3. The method of claim 1, wherein the content is an advertisement, further comprising:
providing the advertisement for display in the ad slot of the web page.

4. The method of claim 1, further comprising:
providing the script to a web page server for execution at the web page server to obtain the advertisement parameters of the ad slot and the web page parameters of the ad slot, and to generate the unique identifier of the ad slot based on the advertisement parameters and the web page parameters;
receiving, at an ad server, the unique identifier of the ad slot; and
matching, by the ad server, the unique identifier of the ad slot and the historical unique ad slot identifier.

5. The method of claim 1, further comprising:
receiving, at an ad server, a request for subject matter to display in the ad slot of the web page;
providing the script to a user device for execution at the user device to obtain the advertisement parameters of the ad slot and the web page parameters of the ad slot;
determining the presence of the historical ad slot data based on the evaluation of the database;
selecting the content to display in the ad slot based at least in part on the historical ad slot data; and
providing the selected content for display in the ad slot of the web page.

6. The method of claim 1, wherein the historical ad slot data includes the historical unique ad slot identifier, the URL identifier of the web page, a location of the ad slot on the web page, and an indication of ad slot activity including at least one of a click through rate, a conversion rate, a click through volume, a conversion volume, a type of advertisement.

7. The method of claim 1, further comprising:
receiving, at an ad server, a request for subject matter to display in the ad slot of the web page;
providing the script to a user device for execution at the user device to obtain the advertisement parameters of the ad slot and the web page parameters of the ad slot;
determining the absence of the historical ad slot data based on the evaluation of the database;
selecting the content to display in the ad slot based at least in part on the advertisement parameters of the ad slot; and
providing the selected content for display in the ad slot of the web page.

8. The method of claim 1, wherein the advertisement parameters comprise at least one of an ad width, an ad height, an ad type, an ad format, and an ad slot name, and wherein the web page parameters comprise a plurality of identifiers of parent nodes of the ad slot in a hierarchical structure of the web page.

9. The method of claim 1, further comprising:
generating the unique identifier of the ad slot using a hash function.

10. The method of claim 9, further comprising:
concatenating the advertisement parameters into a first string;
concatenating the web page parameters into a second string;
combining the first string and the second string to generate a combined string; and
generating the unique identifier of the ad slot using the hash function based on the combined string.

11. A system of identifying ad elements of web pages via a computer network, comprising:
a data processing system comprising at least one processor configured to:
receive a script configured to identify an ad slot on a web page;
provide the script for execution to obtain advertisement parameters of the ad slot and to obtain web page parameters of the ad slot;
generate, based on the advertisement parameters and the web page parameters, a unique identifier of the ad slot, wherein the unique identifier of the ad slot is associated with a URL identifier of the web page;
evaluate at least one database to determine one of a presence of historical ad slot data and an absence of the historical ad slot data by searching for a historical unique ad slot identifier that matches the unique identifier of the ad slot, wherein the historical unique ad slot identifier is associated with the URL identifier of the web page;
determine an absence of a match between the unique identifier of the ad slot associated with the URL identifier of the web page and the historical unique ad slot identifier associated with the URL identifier of the web page;
identify, responsive to the absence of the match, a domain name of the web page associated with the URL identifier of the web page;

associate the unique identifier of the ad slot with the domain name;

associate the historical unique ad slot identifier with the domain name;

detect a match between the unique identifier of the ad slot associated with the domain name and the historical unique ad slot identifier associated with the domain name;

select content based at least in part on the historical ad slot data; and provide the content for display in the ad slot of the web page.

12. The system of claim 11, wherein the data processing system is part of an ad server, further comprising the ad server configured to:

receive a request for subject matter to display in the ad slot of the web page at a user device;

provide the script to the user device, wherein the script is configured to execute at the user device to obtain the advertisement parameters of the ad slot and to obtain the web page parameters of the ad slot, and to generate the unique identifier of the ad slot;

receive by the ad server, the unique identifier of the ad slot;

identify the match between the unique identifier of the ad slot and the historical unique ad slot identifier; and select the content based on the historical ad slot data.

13. The system of claim 11, wherein the content is an advertisement, further comprising the data processing system configured to:

provide the advertisement for display in the ad slot of the web page.

14. The system of claim 11, further comprising:

the data processing system configured to:

provide the script to a user device via the computer network for execution at the user device to obtain the advertisement parameters and the web page parameters, and to generate the unique identifier of the ad slot based on the advertisement parameters and the web page parameters; and match the unique identifier of the ad slot and the historical unique ad slot identifier.

15. The system of claim 11, further comprising:

the data processing system configured to provide the script to a user device via the computer network for execution at the user device to obtain the advertisement parameters and the web page parameters of the ad slot;

an ad server configured to:

receive a request for subject matter to display in the ad slot of the web page;

determine the presence of the historical ad slot data based on the evaluation of the database;

select the content to display in the ad slot based at least in part on the historical ad slot data; and provide the selected content for display in the ad slot of the web page.

16. The system of claim 11, further comprising:

the data processing system configured to provide the script to a user device via the computer network for execution at the user device to obtain the advertisement parameters and the web page parameters of the ad slot;

an ad server configured to:

receive a request for subject matter to display in the ad slot of the web page;

determine the absence of the historical ad slot data based on the evaluation of the database;

select the content to display in the ad slot based at least in part on the advertisement parameters of the ad slot; and provide the selected content for display in the ad slot of the web page.

17. The system of claim 11, further comprising the data processing system configured to:

concatenate the advertisement parameters into a first string;

concatenate the web page parameters into a second string;

combine the first string and the second string to generate a combined string; and generate the unique identifier of the ad slot using a hash function based on the combined string.

18. A non-transitory computer readable medium having machine instructions stored therein, the instructions being executable by one or more processors to cause the one or more processors to perform operations comprising:

obtaining, a script configured to identify an ad slot on a web page;

executing the script to obtain advertisement parameters of the ad slot and web page parameters of the ad slot;

generating, based on the advertisement parameters and the web page parameters, a unique identifier of the ad slot, wherein the unique identifier of the ad slot is associated with a URL identifier of the web page;

evaluating at least one database to determine one of a presence of historical ad slot data and an absence of the historical ad slot data by searching for a historical unique ad slot identifier that matches the unique identifier of the ad slot, wherein the historical unique ad slot identifier is associated with the URL identifier of the web page;

determine an absence of a match between the unique identifier of the ad slot associated with the URL identifier of the web page and the historical unique ad slot identifier associated with the URL identifier of the web page;

identify, responsive to the absence of the match, a domain name of the web page associated with the URL identifier of the web page;

associate the unique identifier of the ad slot with the domain name;

associate the historical unique ad slot identifier with the domain name;

detect a match between the unique identifier of the ad slot associated with the domain name and the historical unique ad slot identifier associated with the domain name;

select content based at least in part on the historical ad slot data; and providing the content for display in the ad slot of the web page.

19. The non-transitory computer readable medium of claim 18, wherein the content includes an advertisement, the instructions further comprising instructions to:

provide the advertisement for display in the ad slot of the web page.

20. The non-transitory computer readable medium of claim 18, the instructions further comprising instructions to:

match the unique identifier of the ad slot and the historical unique ad slot identifier.

* * * * *